Figure 2:
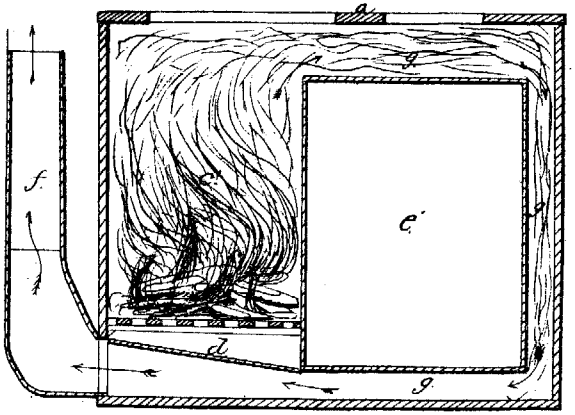
Figure 1:
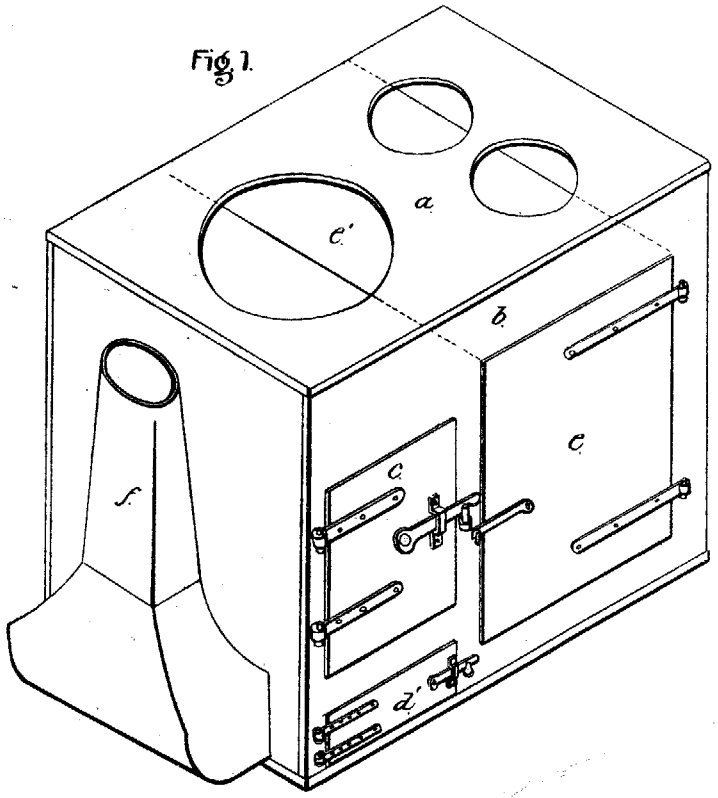

6007X

L. & F. Peterson,

Cook Stove.

Patented May 29. 1830.

Lewis Peterson + Peter Peterson
Letters Patent, dated 29 May 1830

The Schedule referred to in these Letters Patent, and making part of the same, containing a description in the words of the said Lewis Peterson + Peter Peterson themselves, of their improvement in the Cooking Stove.

The Subscribers wish to introduce to the public their new improved Cooking Stove for family use, steam boats, hotels &c &c. they vary in size to suit the purpose they are intended for, and can be made of either wrought or cast iron. The Stove made for family use is of cast iron, thirty inches long, twenty inches wide and twenty six inches high: in the top are three holes to receive the boilers. One of the broad sides being the front of the Stove, it represents the oven, the fire place; and the ash pit; a convenient hearth extends the whole length of the Stove and twelve inches wide; the oven extends from within four inches of the top to within two inches of the bottom of the Stove, forming a flue round the oven of two inches by twenty, being the width of the Stove; the size of the oven is fourteen inches wide, eighteen inches high, and extends back twenty inches, the width of the Stove; the fire place is at the one side of the oven, twelve inches wide and runs back the width of the Stove, leaving a sufficient space for the ash pit and draft directly underneath.

The fire being at one side of the oven and near the top of the Stove, the fire passes directly over the oven and the flue descends down the other side and continues underneath the oven and ashpit to the extreme end of the Stove. From this advantageous application of the fire, this Stove is heated thoroughly and equally in all parts.

The first action of the fire is to the boilers which set in the top of the Stove, it then passes round the oven and underneath the ashpit where it rises into the pipe; consequently the whole effect of the fire is applied before it can possibly pass off into the pipe, which is a great saving of fuel and an important improvement.
Having described this cooking stove, we will now draw your attention to the advantages.
It is simple in the construction and not liable to get out of order; consumes very little fuel; will take up but little room; can be placed in any part of a room to suit convenience; a saving of labour to the cook; and will do away the necessity of the principal cooking utensils used in a kitchen, inasmuch as this stove comprises every convenience necessary for cooking. Baking, roasting, boiling, steaming, stewing, frying and broiling, all can be done at the same time without any inconvenience, one to the other.

Witnesses
Alexr McDonald
John Freeman

Louis Peterson
Peter Peterson

Exd W.G.C.

Patented